UNITED STATES PATENT OFFICE.

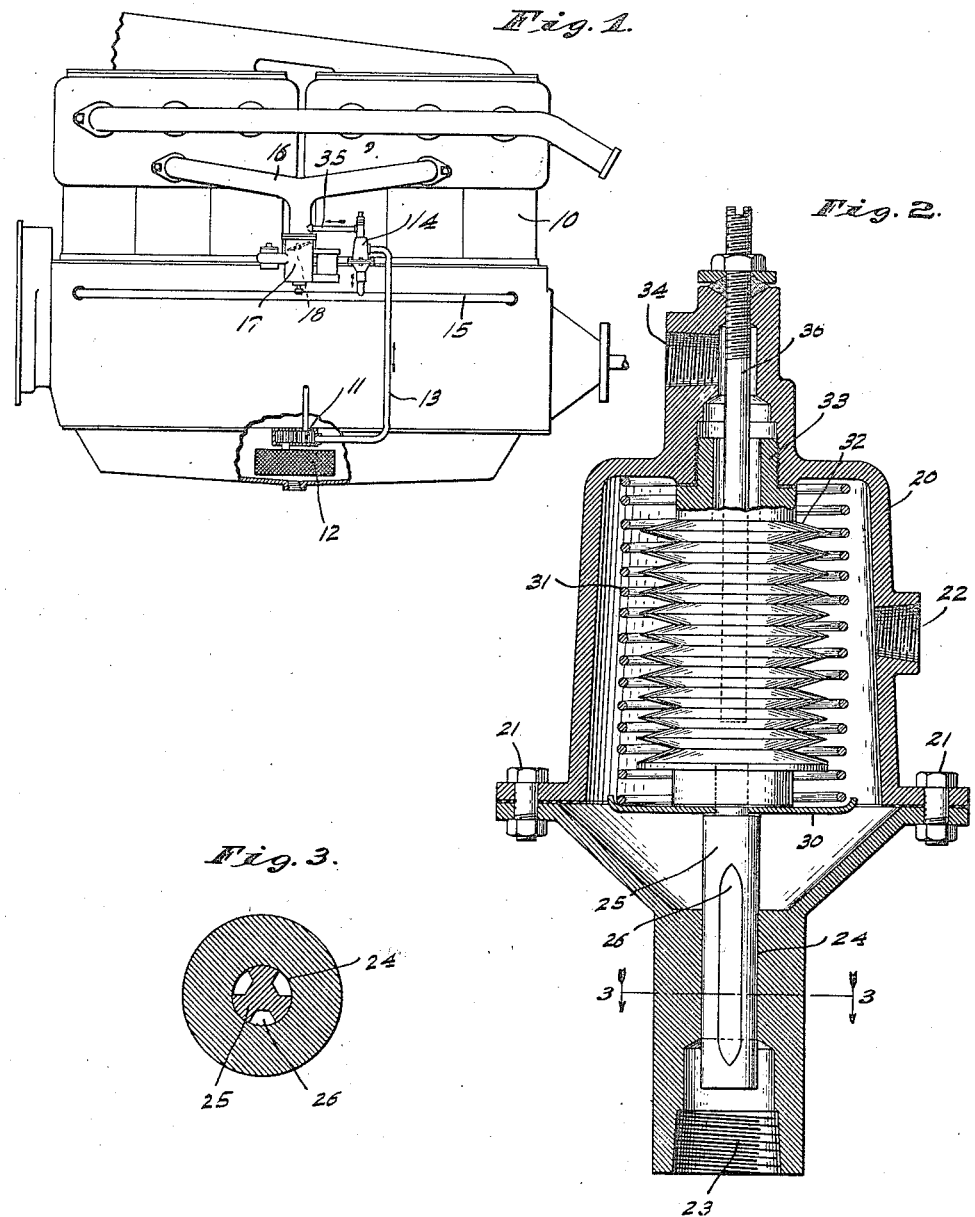

HOWARD C. MARMON, OF INDIANAPOLIS, INDIANA.

MEANS FOR OILING EXPLOSION-MOTORS.

1,156,608.    Specification of Letters Patent.    Patented Oct. 12, 1915.

Application filed June 5, 1915. Serial No. 32,440.

*To all whom it may concern:*

Be it known that I, HOWARD C. MARMON, a citizen of the United States, residing at Indianapolis, in the county of Marion and State of Indiana, have invented a new and useful Means for Oiling Explosion-Motors, of which the following is a specification.

The lubrication requirements of internal combustion engines vary with the load. A heavily loaded engine requires more lubrication than a lightly loaded engine. In consequence, engines which are properly lubricated for heavy loads are over lubricated when the load is lightened, and the extra lubricant causes considerable trouble by being drawn into the combustion chambers of the engine, working up past pistons and piston rings, and being burnt to produce the blue smoke which is often visible from the exhaust. This drawing up of the extra lubricant into the combustion chambers is due not only to the fact that there is present the extra amount of lubricant, but also to the fact that when the engine is running with a light load, with the throttle nearly closed, the vacuum produced in the combustion chamber on the suction stroke is many times greater than when the engine is running under full load, with the throttle wide open. Thus a change in the load means a like change in the lubrication requirements and an inverse change in the vacuum produced.

It is the object of my invention to provide a lubrication control system in which the amount of lubrication is varied to meet the requirements. I do this by providing a valve which controls the supply of lubricant to the parts of the engine needing lubrication, and control such valve by the vacuum on the intake side of the engine, so that as the vacuum increases the amount of lubricant supplied is decreased, and vice versa.

The accompanying drawing illustrates my invention.

Figure 1 is a side elevation of an engine embodying my lubrication control system, part of the casing being broken away; Fig. 2 is a central sectional view through the automatic lubrication control valve; and Fig. 3 is a section on the line 3—3 of Fig. 2.

The engine 10 in connection with which I have illustrated my invention has a forced lubrication system, wherein a pump 11 operated in any suitable manner from the engine draws oil through a screen 12, and discharges it by a pipe 13 through my automatic lubrication control valve 14 into a pipe 15 which leads to the various parts to be lubricated. This system is shown merely by way of example, as my automatic lubrication control valve can be used to control the amount of lubrication in other lubrication systems, and in the system shown can be on either the intake or the discharge side of the pump. The engine 10 also has any usual form of intake manifold 16, which is supplied with the explosive mixture by a carbureter 17 having the usual throttle 18.

The casing 20 of the automatic lubrication control valve is conveniently made in two parts fastened together by bolts 21, and has a lateral opening 22 for connection with the intake pipe 13 and a bottom opening 23 for connection with the discharge pipe 15. The passageway between the openings 22 and 23 includes a cylindrical portion 24 in which fits a valve stem 25 which is provided with any desired number of longitudinal grooves 26 on its surface. These grooves 26 extend both above and below the closely fitting portion 24, and the lower ends of the grooves 26 are tapered, as is clear from Fig. 2, to coöperate with the lower edge of the portion 24 to vary the size of the oil passageway leading to the discharge opening 23, as the stem 25 is raised and lowered. Fig. 2 shows this passageway fully open, which is the case when the valve stem 25 is in its lowermost position.

The upper end of the valve stem 25 has rigidly mounted on it a laterally extending plate 30, between which and the upper end of the casing 20 is located a compression spring 31 which tends to force the plate 30 and valve stem 25 downward. This spring 31 surrounds a hollow metal compression shell 32, the lower end of which is closed and is fastened to the upper end of the valve stem 25, above the plate 30, and the upper end of which has a screw-threaded plug 33 which is mounted in the casing 20 near the top. The plug 33 is hollow, to connect the interior of the compression shell 32 to a lateral opening 34 in the casing 20 above the plug 33, which opening is connected by a pipe 35 to the intake manifold 16, so that the pressure within the shell 32 may correspond with that within such intake manifold. A stop pin 36 has a screw-threaded mounting in the top of the casing 20, whereby it may be adjusted, and extends down through the plug 33 nearly to the bottom of the shell 32, so as to act as a stop to limit the upward movement of the bottom of such shell.

In operation, the variations in the vacuum in the intake manifold 16 cause corresponding variations within the shell 32, and thereby cause the lower end of such shell and the valve stem 25 to move upward against the spring 31 as the vacuum in the intake manifold 16 rises, and to be moved downward by the spring 31 as such vacuum falls. The vacuum in the intake manifold varies inversely as the load which the engine is called upon to carry, so that as such load rises and the throttle is opened the valve stem 25 descends, and as such load falls and the throttle is closed the valve stem 25 ascends. The rising of the valve stem 25 diminishes the supply of oil to the pipe 15, and to the parts to be lubricated, and the falling of such valve stem increases such supply of oil. Therefore, the supply of oil for lubrication is varied inversely as the vacuum in the intake manifold 16, or directly as the load which the engine is called upon to carry. This avoids excessive lubrication under light loads, and in large part if not entirely prevents the discharge from the exhaust of the disagreeable blue smoke which is caused by the combustion of an excess of oil in the cylinders.

I claim as my invention:

1. In combination, an internal combustion engine having an intake for explosive mixture, a lubricant supply pipe for said engine, means operated by the engine for forcing lubricant through such pipe, a valve in said pipe, and means for controlling said valve by the vacuum in said intake.

2. In combination, an internal combustion engine having an intake for explosive mixture, a lubricant supply pipe for said engine, a valve in said pipe, and means for controlling said valve by the vacuum in said intake.

3. In combination, an internal combustion engine having an intake for explosive mixture, a lubricant supply pipe for said engine, means operated by the engine for forcing lubricant through such pipe, a valve in said pipe, and a compression shell mechanically connected to said valve and pneumatically connected to said intake so as to vary in size in accordance with variations in the vacuum in such intake.

4. In combination, an internal combustion engine having an intake for explosive mixture, a lubricant supply pipe for said engine, a valve in said pipe, and a compression shell mechanically connected to said valve and pneumatically connected to said intake so as to vary in size in accordance with variations in the vacuum in such intake.

5. In combination, an internal combustion engine having an intake for explosive mixture, a lubricant supply pipe for said engine, means operated by the engine for forcing lubricant through such pipe, a valve in such pipe, and means responsive to the vacuum in such intake for varying the opening of such valve inversely as such vacuum.

6. In combination, an internal combustion engine having an intake for explosive mixture, a lubricant supply pipe for said engine, a valve in such pipe, and means responsive to the vacuum in such intake for varying the opening of such valve inversely as such vacuum.

7. In combination, an internal combustion engine having an intake for explosive mixture, means operated by the engine for supplying lubricant to the engine, and a pressure responsive device controlled by the vacuum in such intake for varying the supply of lubricant inversely as such vacuum.

8. In combination, an internal combustion engine having an intake for explosive mixture, means for supplying lubricant to the engine, and a pressure responsive device controlled by the vacuum in such intake for varying the supply of lubricant inversely as such vacuum.

In witness whereof, I HOWARD C. MARMON, have hereunto set my hand at Indianapolis, Indiana, this 2 day of June, A. D. one thousand nine hundred and fifteen.

HOWARD C. MARMON.